May 20, 1930.   W. C. KELSO   1,759,578

MILK COOLING DEVICE

Filed July 2, 1928

Inventor
WILLIAM C. KELSO
By Thomas L. Ryan
Attorney

Patented May 20, 1930

1,759,578

UNITED STATES PATENT OFFICE

WILLIAM C. KELSO, OF RUSHVILLE, INDIANA, ASSIGNOR, BY DIRECT AND MESNE ASSIGNMENTS, TO WILLIAM J. WILSON AND PEARL WILSON, OF RUSH COUNTY, INDIANA

MILK-COOLING DEVICE

Application filed July 2, 1928. Serial No. 289,897.

Whereas my invention is described in this specification, as being of utility in the handling of milk and for lowering the temperature thereof, it will be understood that the invention is adapted for the handling of liquids of various kinds, and for changing the temperature thereof to a lower degree, or to a higher degree, as may be desired.

In the business of caring for and handling fresh milk, it is essential that the temperature of same may be lowered to proper degree as soon as possible.

Advantages to be desired are, that the cooling of the milk may be done expeditiously and in a sanitary manner, and with the expenditure of a minimum amount of expense and labor.

In carrying out my invention I have embodied same in a mechanism especially suited for use in connection with the milk container of standard size, which is constructed of sheet metal, and is about twelve inches in diameter, and about twenty-three inches in height. The stout funnel shaped mouth, reinforced at its annular rim, is about nine inches in diameter, and the neck portion of the container is about six inches in diameter. Containers of this type are extensively used by dairymen and by transportation and distributing forces, and it is desirable that the milk to be transported in said container may be prepared by proper cooling, with a minimum expenditure of time and labor, and a minimum amount of handling.

Accordingly, the objects of my invention are to provide a cooling device which is relatively light in weight, economical of manufacture, easy to manipulate and use, and which is easy to maintain in sanitary condition.

The objects of my invention are accomplished by, and the invention is embodied in the new construction, combination and arrangement of parts illustrated in the accompanying drawings, and described in the following specification.

The several parts of the invention are identified by suitable characters of reference applied thereto in the different views in the drawings in which—

Figure 3:
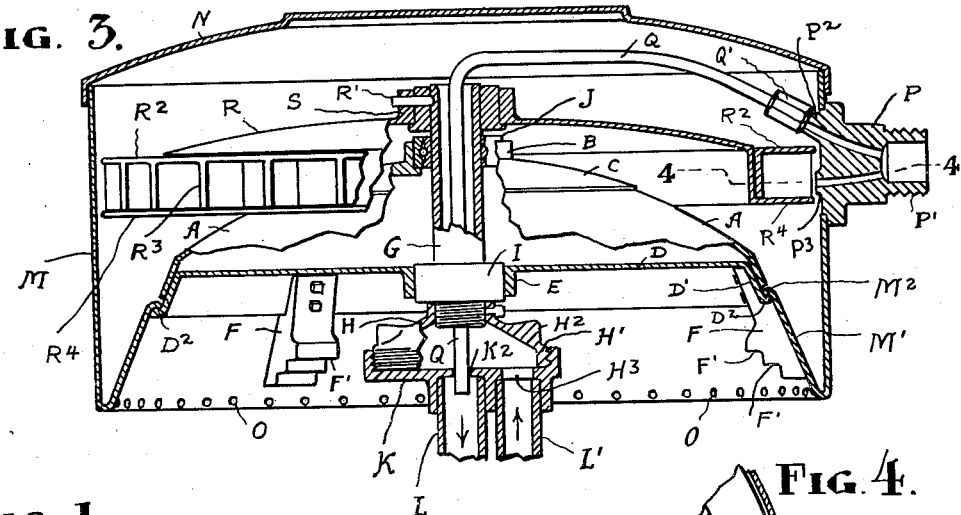
Figure 3 is an enlarged vertical sectional view of the fountain box and cover structure, and the several operative parts of the invention.

Broadly stated, the invention consists of a cover structure adapted to be reposed above the mouth of the liquid container, a conduit device supported by said cover structure and capable of rotative movement and which extends through and above said cover structure, a pipe coil communicating with, carried by, and which is extended downwardly from said conduit device, and a water supply pipe having flexible union with the pipe coil. Means above the cover structure to rotate the conduit device and to diffuse the water that passes therefrom, and a fountain box to receive the water so diffused and to discharge the said water within the area bounded by the walls of the liquid container, are also provided.

In the preferred form of embodiment of my invention, as illustrated in the drawings, the jet from a common garden hose, constitutes the water supply for the pipe coil, and its energy is utilized for and it constitutes the power for actuating the means for rotating the conduit device and for diffusing the water that passes therefrom.

The cover structure consists of a convex shell A made of suitable sheet metal, and which is provided with a central bore of suitable diameter. A housing B which is secured in position concentric with said bore has an extended circular flange C which may be relatively thin and which lies in sealed contact with the top surface of the shell A. A cross member D whose arcuate rim portions $D^1$ are secured to the marginal portions of the shell A, has a central bore, and a housing E. The function of the downwardly extended rim portion D¹, as shown in Figure 3, will be presently referred to. Seat pieces F, three in number, are secured at positions equidistant from each other, on the underside of said cross member D, and are provided with offsets F¹ which are adapted to engage the rim of the liquid container. By providing a plurality of the offsets F¹ in said seat pieces, the variation in diameters of the mouth rims 1 of the containers, is compensated, the cover structure therefore being more generally adaptable.

The conduit device consists of a tubular column G whose lower end is secured in the central bore of a concave head member H the rim portion H¹ of which is externally threaded. The said tubular column is supported for rotation, by ball bearings I and J which are retained in the housings E and B respectively. The function of the integrally formed lugs H² provided on said head member H will be presently referred to.

A circulatory element or pipe coil of the preferred form, is that shown in the drawings, and it consists of a copper pipe, tinned, and of spiral formation, and the head member K. This head member has an internally threaded rim adapted to be screwed to water tight engagement with the rim of the head member H. In the center of this head member K, is a smooth bore K² of relatively small diameter shown. The entry portion L of the said coil is secured in the bore of a suitable boss provided centrally of the underside of said head member K. The return portion L¹ of said coil has its end secured in a suitable boss, and opens through a hole H³ in said head member. It will be understood that the pipe coil may be constructed of form other than the spiral formation shown, or it may consist of a series of pipes or conduit sections suitably assembled and connected together to constitute a circulatory means leading from and returning to the head member K and the conduit device above.

Surrounding the cover structure is a fountain box having the cylindrical walls M, and a cap plate N. The annular inclined wall M¹ constituting the trough, has its inturned edge M² to engage the offset D², and it is there secured in alignment with the marginal portion of the cover shell A. At the inner portion of the bottom and throughout the extent of the trough, are spaced perforations O through which the water content of the fountain box is discharged for playing over the surfaces of the liquid container below. Whereas this fountain box in the present embodiment, is of circular formation, its form in plan may be modified in conformity with the size, and plan formation and area of the container.

A fitting P is secured at an opening provided therefor at proper height in the wall of the fountain box, and it has a shank P¹ of proper diameter and threaded to receive the coupling ring of a standard garden hose or water pipe (not shown). In the said fitting is provided an upper passageway terminated by a threaded nozzle P², and a lower passageway, terminated by a nozzle P³.

A water wheel R of disk like formation, slightly convex in cross section, has its hub bushing S secured by a pin R¹ to the upper end of the tubular column G. The peripheral portion of this wheel is of pocketed formation, there being secured on the L shaped rim, a ring shaped piece R² which is provided with spaced radial vanes R³. The height between the top of ring piece R², and the bottom R⁴ of the wheel rim is such that the bottom R⁴ of the wheel is on a plane below that of the nozzle P³, and the top R² is on a plane below that of the nozzle P².

A water supply pipe Q has its free end disposed within the interior of the tubular column G, and retained in loose but close fitting engagement with the bore K² of the pipe coil head member K, and in communication with the entry portion L of the pipe coil. The other end of the said water supply pipe is united with the nozzle P², by a suitable union joint Q¹.

Figure 1:
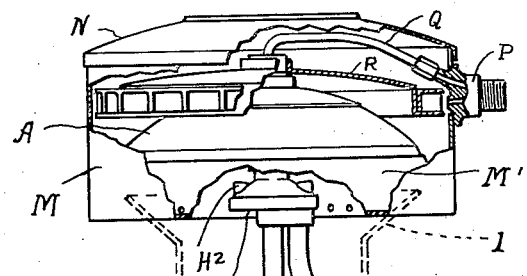
Figure 1 is a side view of my invention in operative position in connection with a milk transport can of standard type; portions of the device being broken away, and the can being indicated by dotted lines.
Figure 4:
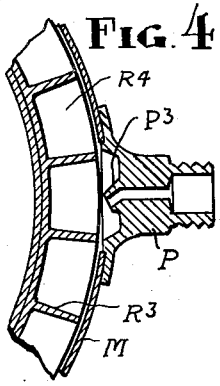
Figure 4 is a sectional top plan view taken on the line 4—4 in Figure 3.
Figure 2:
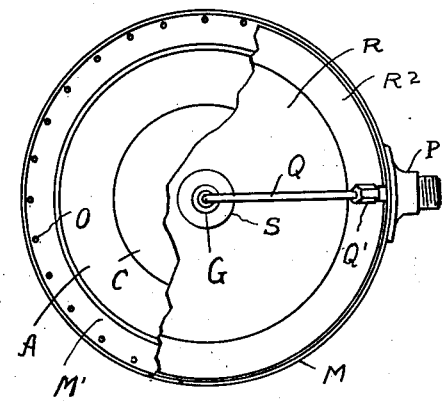
Figure 2 is a top plan view of Figure 1, the cap plate of the fountain box having been removed, and a portion of the water wheel having been broken away.

The invention in readiness for use, appears as shown in Figure 1, the pipe coil having been cleansed and rendered sanitary, before uniting it to the head H of the conduit device. To unite the said parts, the head H is held by the hand engaging the lugs H²; and with the other hand, screwing the head K of the coil pipe to the sealed and seated engagement, as shown in Figure 3.

In lowering the device to operative position, the pipe coil will have become immersed in the milk contained in the can, the cover structure and its connected parts being supported by the seat pieces F on the mouth rim of the container. Through the space intervening between the mouth of the container, and the cover structure, ample circulation of air above the container is assured.

Through a suitable hose or pipe connection (not shown) applied to the shank of the fitting P, water moving under the usual velocity of a standard water supply head, is passed through the nozzles P² and P³. The water passing through the inlet pipe Q, and the pipe coil and the tubular column G, as shown by the arrows in Figure 3, is deflected by the cap plate N whence it flows upon the top surface of the water wheel and is discharged against the wall of the fountain box and downwardly into the trough whence it flows freely through the perforations O. Coincidentally with the above operation, the force of the water from nozzle P³, in its contact with the vanes of the water wheel, causes the latter and also the pipe coil, to be rotated. By the action and cooperation of the several parts as above described, the coil pipe throughout its entire extent, is caused to be maintained at low temperature, and there is also caused a rapid and equable diffusion of the water which is passed upwardly and from the tubular column G. The water diffused in its flow upon the surface of the water wheel, and the water which will have actuated the wheel and have been emptied from its pockets, besides having been of efficiency in maintaining cool, the pipe coil, and of rotating it, is efficient in flooding the walls of the liquid container.

By the use of this invention it is practicable to cool the fresh milk in the container, as received from the prime source of supply, the temperature of same at this stage being around ninety to ninety eight degrees. With water flowing through the nozzles P² and P³ at the usual water supply temperature of about fifty-two degrees, the temperature of the milk will have been reduced, within about five minutes, to a temperature of about sixty-five degrees; and within eight to ten minutes, to within about two degrees of the temperature of the water.

The operation of the device is started and stopped, by the turning on or off (by a valve not shown in the hose or supply pipe) of the water supply. For taking care of the milk in a number of containers, a number of the devices may be used; or a single device may be operated upon the milk of one container after another. To detach the pipe coil, the head member K is simply unscrewed from the head member H, after which it may be sterilized by scalding or by any other desired process. By the peculiar construction and arrangement of the several operative parts there is no possibility of water entering the container. By having the riser C on the cover shell A, there is avoided even the possibility of any water entering which might flow upon the shell (when the fountain box is being handled when not in actual use) and in proximity with the ball bearing J. The device will operate with a minimum of friction, and practically noiselessly, and with water under usual or relatively light pressure.

Although in the present specification, the invention is referred to as being especially applicable for cooling milk, it will be understood that the invention is also of utility in instances where it is desirable to heat milk for the purpose of sterilizing or pasteurizing thereof. By the introduction of steam or hot water through the nozzle, the temperature of liquid contents of the receptacle may be raised to such degree as may be desired, and in a relatively short period of time.

In the construction of my invention, the several parts may be made of cast or sheet metal, and there may be various modifications in structural form and detail, within the scope of the invention, as defined by the appended claims, without departing from the spirit of the invention or sacrificing any of its advantages.

What I claim as my invention, and desire to secure by Letters Patent, is:—

1. A liquid cooling device, comprising a cover structure adapted to be reposed above the mouth of a liquid container, a tubular conduit device supported by said cover structure and capable of rotative movement, and which extends through and above said cover structure, a pipe coil communicating with, carried by, and which is extended downwardly from said conduit device, and a water supply pipe of diameter less than the bore of the conduit device, and which enters into and has a swivel union with the pipe coil.

2. A liquid cooling device, comprising a cover structure adapted to be reposed above the mouth of a container, a tubular conduit device supported by and journaled vertically in the cover structure, a circulatory element communicating with, secured to and which is extended downwardly from said conduit device, a water supply pipe of diameter less than the bore of the conduit device and which has a swivel union with the entry portion of the circulatory element, a fountain box having its trough portion surrounding the lower portion of the cover structure, a water wheel hubbed to the conduit device at position above the cover structure, and a device to divide the head of water entering same, into an upper and a lower jet, the upper jet being operable through the conduit and circulatory element to pass in and through the latter, and the lower jet being operable to actuate the water wheel.

3. A liquid cooling device of the kind described, comprising a cover structure adapted to be reposed above the mouth of a liquid container, a pipe coil having a tubular neck supported by said cover structure for rotation and which projects above said cover structure, the said neck being provided with a chamber at its lower portion, the return portion of the coil entering said chamber, a partition in the entry portion of the coil at a location below the said chamber and having a bore therethrough, an inlet pipe passed down the neck and through the partition and being journaled in the latter, a fountain box having its trough portion surrounding the cover structure and adapted to discharge within the area bounded by the walls of the container, a water wheel in the fountain box to rotate the pipe coil and to diffuse the water flowing from the neck thereof, and a device adapted to receive water supply under pressure and having a jet to actuate the water wheel, and having a jet opening provided with nozzle for connection with the inlet pipe aforesaid.

4. A liquid cooling device, comprising a cover structure, seat pieces on the cover structure to sustain the cover structure at height spaced above the mouth of a liquid container, a tubular conduit supported by and journaled for rotation in the cover structure and being projected above same, there being a flared open head on the bottom of the conduit, a circulatory element having its entry portion and return portion retained in proximate positions by a head member, the return portion opening through said head member, and there being a relatively small bore opening from the said head member into the entry portion of the circulatory element, and the said head member being adapted for removable connection with the flared head of the conduit, an inlet pipe passed through the said conduit and being journaled in the bore of the head of the circulatory element, a fountain box having a trough portion surrounding the cover structure, a disk like water wheel slightly convex in cross section formation hubbed to the said conduit device, and a device adapted to receive water supply under pressure and having a jet to actuate the water wheel, and having a jet opening provided with a nozzle for connection with the said inlet pipe.

5. A device for changing the temperature of liquids, comprising a cover structure adapted to be reposed above the mouth of a liquid container, a tubular conduit device supported by and journaled in the cover structure, a circulatory element communicating with, carried by, and secured to said conduit device, and a supply pipe passed through the conduit device and having a swivel union with the entry portion of the circulatory element.

6. In a device for changing the temperature of liquids, the combination of a cover structure adapted to be reposed above the mouth of a liquid container, a pipe coil having a tubular neck supported by said cover structure and capable of rotative movement, and which extends through and above said cover structure, the said neck being provided with a chamber at its lower portion, the return portion of the coil entering the said chamber, a partition in the entry portion of the coil at a location below the said chamber and having a bore therethrough, and an inlet pipe passed down the neck and through the said partition and being journaled in the latter.

7. In a device of the kind described the combination of a cover structure adapted to be reposed above the mouth of a liquid container, a tubular conduit supported by and journaled for rotation in the cover structure and being projected above the same, there being a flared open head on the bottom of the conduit, a circulatory element having its entry portion and return portion retained in proximate positions by a head member, the return portion opening through said head member and there being a relatively small bore opening from the said head member into the entry portion of the circulatory element and the said head member being adapted for removable connection with the flared head of the conduit, and an inlet pipe passed through the said conduit and being journaled in the bore of the head of the circulatory element.

8. A device of the kind described, comprising a cover structure adapted to be reposed above the mouth of a container, a tubular conduit device supported by and journaled vertically in the cover structure, a circulatory element communicating with, secured to and extended downwardly from said conduit device, a water supply pipe of diameter less than the bore of the conduit device and which has a swivel union with the entry portion of the circulatory element, a water wheel hubbed to the conduit device at position above the cover structure, and a device to divide the head of water into an upper and a lower jet, the upper jet being operable through the conduit and circulatory element to pass in and through the latter, and the lower jet being operable to actuate the water wheel.

WILLIAM C. KELSO.